United States Patent [19]
Kawatani et al.

[11] Patent Number: 6,016,647
[45] Date of Patent: Jan. 25, 2000

[54] MANUFACTURING METHOD AND APPARATUS OF STEEL CORD FOR RUBBER PRODUCT REINFORCEMENT

[75] Inventors: Hiroshi Kawatani; Shigeru Suzuki, both of Kitakami, Japan

[73] Assignee: Tokyo Rope Manufacturing Co., Ltd., Tokyo, Japan

[21] Appl. No.: 09/073,679

[22] Filed: May 6, 1998

[51] Int. Cl.[7] .................................................. D01H 13/26
[52] U.S. Cl. ................................. 57/9; 57/12; 57/58.65; 57/65; 57/311
[58] Field of Search ................................ 57/311, 3, 9, 12, 57/13, 58.65, 65, 62, 63, 902

[56] References Cited

U.S. PATENT DOCUMENTS

| | | | |
|---|---|---|---|
| 5,581,990 | 12/1996 | Van Giel et al. ............................... | 57/9 |
| 5,651,246 | 7/1997 | Kusaba ........................................ | 57/311 |
| 5,707,467 | 1/1998 | Matsumaru et al. ......................... | 57/311 |
| 5,722,226 | 3/1998 | Matsumaru .................................. | 57/311 |

FOREIGN PATENT DOCUMENTS

| | | | |
|---|---|---|---|
| 5-186978 | 7/1993 | Japan . | |
| 48150 | 4/1940 | Netherlands ............................. | 57/311 |

*Primary Examiner*—William Stryjewski
*Attorney, Agent, or Firm*—Michael J. Striker

[57] ABSTRACT

A method for using a bunching type twisting machine to manufacture a steel cord made up of one core filament having a continuous wavy form and five to eight sheath filaments not having a wavy form disposed around the core filament, the cross-sectional shape of the cord forming an ellipse whose orientation is substantially constant in the length direction of the cord. After a core filament is preformed with a helical wavy form of a smaller pitch than the cord twisting pitch, this is squashed to form a flat helical core filament at a stage before it is twisted together with sheath filaments, and then sheath filaments are twisted around this flat helical core filament to make an intermediate product cord and this intermediate product cord is then squashed and thereby flattened before being taken up on a reel.

16 Claims, 6 Drawing Sheets

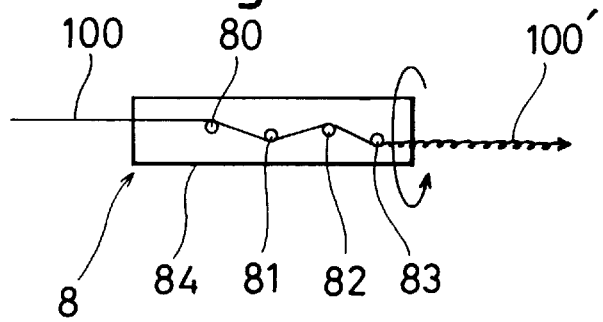
Fig. 2
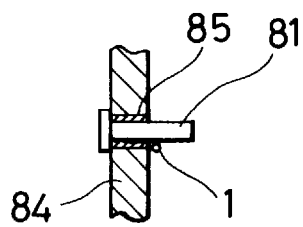
Fig. 2-A
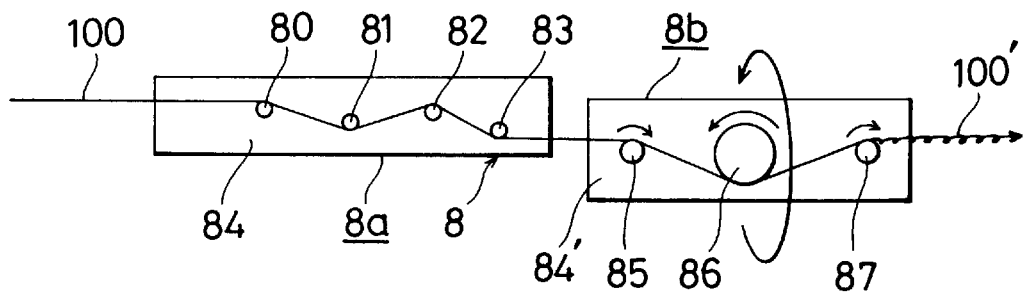
Fig. 3
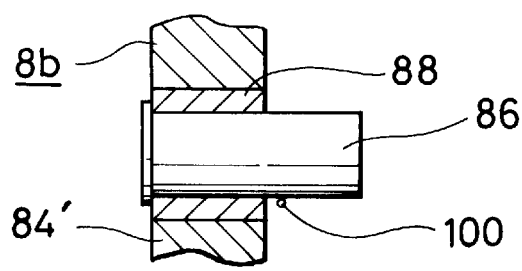
Fig. 3-A

Fig. 4
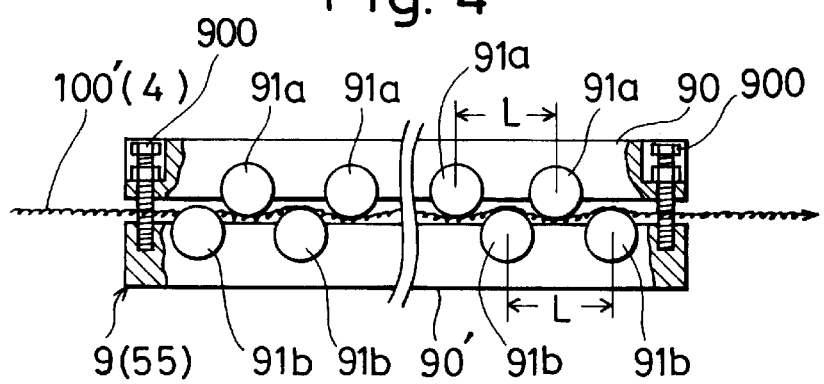
Fig. 4-A
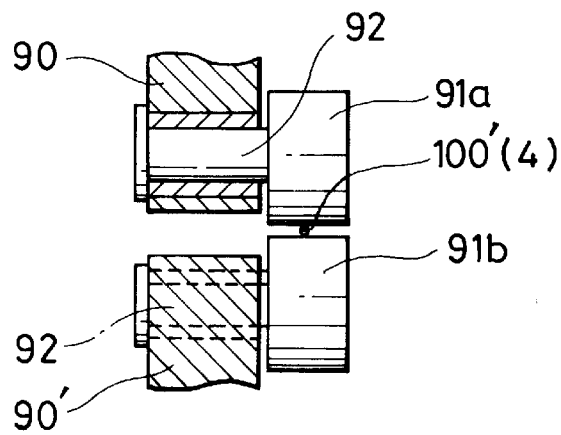
Fig. 4-B
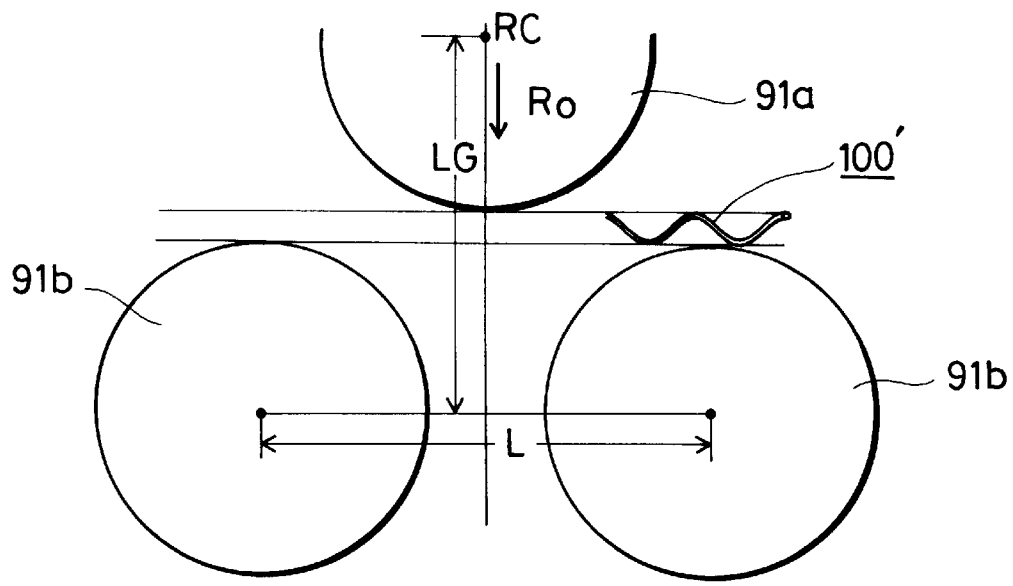

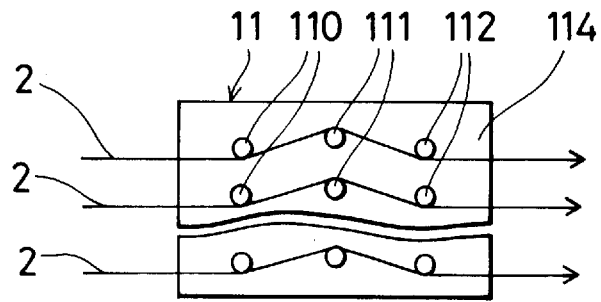
Fig. 5
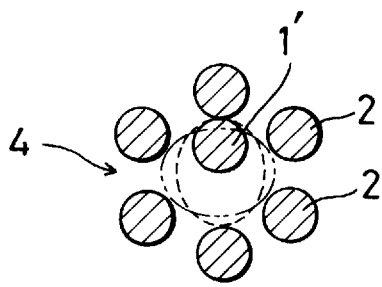
Fig. 6-A
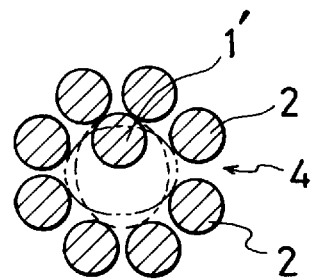
Fig. 6-B
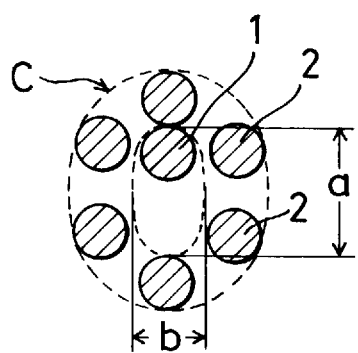
Fig. 7-A
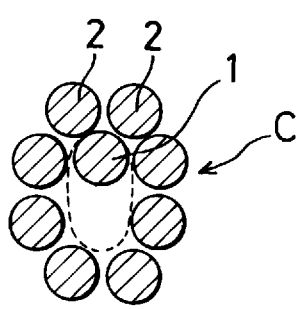
Fig. 7-B
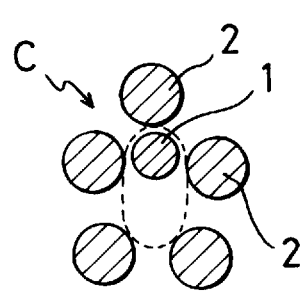
Fig. 7-C

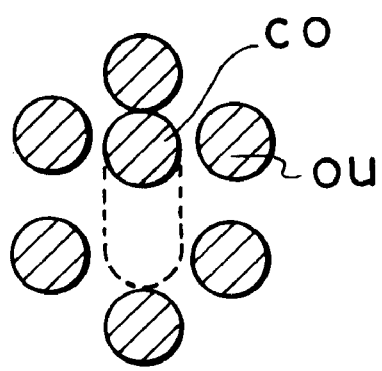
Fig. 8-A
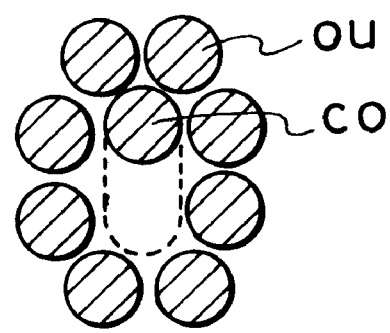
Fig. 8-B

Fig. 9
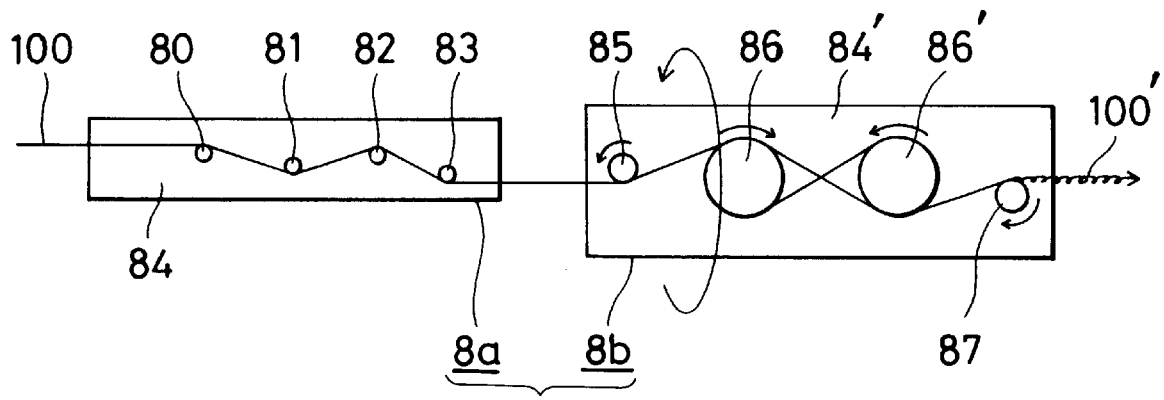
Fig. 9-A
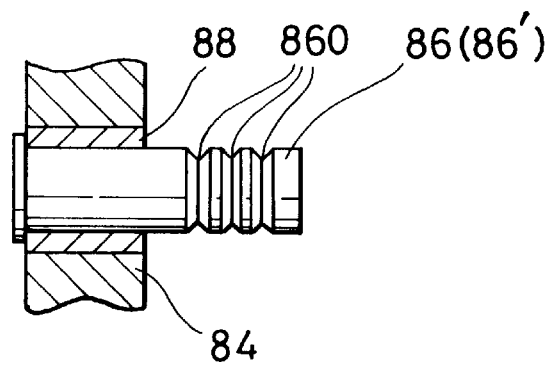
Fig. 10-A
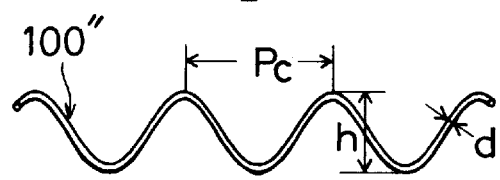
Fig. 10-B
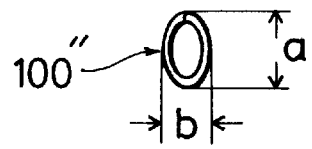

MANUFACTURING METHOD AND APPARATUS OF STEEL CORD FOR RUBBER PRODUCT REINFORCEMENT

BACKGROUND OF THE INVENTION

1. Field of the Invention

The present invention relates to a method and apparatus for manufacturing a steel cord of a specified structure for use as a reinforcing material of rubber products such as radial vehicle tires and conveyor belts.

2. Description of the Related Art

Steel cords are commonly used as a reinforcing material in rubber products such as radial vehicle tires and conveyor belts.

These steel cords are generally made by twisting together a plurality of steel wires, but if they are not well integrated with the rubber matrix they cannot function fully as a reinforcing material. Also, when the rubber matrix does not penetrate well into the inside of the steel cord, water enters spaces inside the steel cord not filled by the rubber matrix, and as a result corrosion spreads and the life of the rubber composite itself also falls.

To solve this kind of problem, in Japanese Patent Publication No. H.5-186978 there is disclosed a steel cord of a 1+6, 1+7 or 1+8 structure which comprises six to eight sheath steel filaments (hereinafter referred to as sheath filaments) around a single core steel filament (hereinafter referred to as a core filament) preformed into a two-dimensional wavy form and of which the sectional shape perpendicular to the length direction of the cord is elliptical.

FIG. 8-A and FIG. 8-B show this steel cord; in these figures, co is a core filament preformed with a two-dimensional wavy form and ou is a sheath filament. In a steel cord of this structure, as a result of the wavy form of the core filament co, gaps are formed between the filaments and rubber can penetrate easily into the cord. And, because the sectional shape of the cord is flat and is uniform in the cord length direction, it is also easy to work during calender processing and there is the merit that the gauge thickness of rubber into which it is embedded can be made thin.

However, in this related art, there is no disclosure of a method for manufacturing a steel cord having these characteristics. A general method for manufacturing a steel cord of this kind of I+n structure uses a tubular twisting machine. That is, a zigzag-shaped preform is formed in a core filament, sheath filaments each having a predetermined amount of preform are wound around the core filament with a tubular twisting machine (at this time, the filaments are not twisted), and after that the sectional shape of the steel cord is formed into an elliptical shape by means of a flattening device such as correcting rollers. However, with methods that use a tubular twisting machine there has been the major problem that productivity is poor and the product cost consequently is high.

As a way of overcoming this it is convenient to manufacture a cord with a double-twist (bunching) type twisting machine. With methods that use a bunching type twisting machine, since two twists can be made in a single rotation, the manufacturing efficiency is high and the product cost can be reduced.

However, in a bunching type twisting machine, in the twisting process, all the filaments are twisted together at once in a bundled state. Because of this, the sectional shape of the steel cord collapses and the flat faces (the major axis sides) fail to align in a fixed direction and the gaps between the sheath filaments become non-uniform, and as a result stability of shape, which is an important characteristic of a steel cord, is lost and also the rubber penetration becomes unstable. Consequently, it has been difficult for the steel cord to be brought into use industrially.

SUMMARY OF THE INVENTION

It is therefore an object of the present invention to provide a method by which it is possible to manufacture cheaply a specified steel cord consisting of one core filament having a continuous wavy form and five to eight sheath filaments disposed around this and not having a wavy form, the cross-sectional shape of the cord as a whole forming an elliptical shape, by effectively using a double-twisting method.

A second object of the invention is to provide an apparatus suitable for practicing such a method.

To achieve the above-mentioned objects and other objects, according to the invention, using a bunching type twisting machine, after a core filament is preformed with a helical wavy form of a shorter pitch than the cord twisting pitch, this is squashed to make a flat helical core filament at a stage before it is twisted together with sheath filaments, and then sheath filaments are twisted around this flat helical core filament to make an intermediate product cord and this intermediate product cord is then squashed and thereby flattened before being taken up on a reel.

More specifically, in a method for using a bunching type twisting machine to manufacture a steel cord whose cross-sectional shape forms an elliptical shape having a substantially constant orientation in the cord length direction made up of one core filament having a continuous wave and n (n=5 to 8) sheath filaments disposed around the core filament, the core filament is drawn from a single supply bobbin and preformed on the pass line with a helical wavy form and then compressed from 180°-symmetrical positions into a flat helical form. Meanwhile, n sheath filaments are drawn from supply bobbins and each given a preform for twisting on the pass line and then the sheath filaments are converged around the flat helical core filament to form a filament bundle. This filament bundle is pretwisted to a shorter twist pitch than the twist pitch to be formed by the twisting machine and then fed to the twisting machine and twisted to make an intermediate product cord. This intermediate product cord is then compressed from 180°-symmetrical positions while under tension inside the twisting machine and thereby formed into a final cord shape and then taken up onto a reel.

With this method, a steel cord consisting of one core filament having a wavy preform and n (n=5 to 8) sheath filaments around this and having a cross-sectional shape which is elliptical and uniform in the cord length direction can be manufactured with good productivity by making use of the advantages of a bunching type twisting machine.

The present inventors also considered a method of making an intermediate product cord by twisting a core filament preformed with a helical wavy form (the shape of the helix being circular) directly with n (n=5 to 8) sheath filaments and compressing that intermediate product cord from 180°-symmetrical positions to work it into an elliptical shape. However, when this method was employed, the following problems arose. That is, it is difficult to make compressing forces act sufficiently on the central core filament through the outer sheath filaments, and consequently the core filament does not plastically deform sufficiently and does not readily become flat. When stronger compressing forces are applied to the intermediate product cord to ensure plastic deformation, the helical core filament gets between the sheath filaments and shape defects and rubber penetration defects arise.

To overcome this, in the present invention, the core filament preformed with a helical wavy form is compressed from 180°-symmetrical positions into a flat helical shape before it is twisted together with the sheath filaments. Then, after the core filament is twisted together with the sheath filaments, this intermediate product cord is compressed from 180°-symmetrical positions to flatten the whole cord and also compress the core filament. As a result of this two-stage compressing process being employed, the wavy shape of the core filament becomes an almost two-dimensional wave, and the amplitude of the wave (in the elliptical locus direction) becomes stable uniform in the length direction. And, the orientation of the elliptical sectional shape of the cord also becomes stable and constant in the cord length direction. Therefore, a steel cord of which the rubber penetration also is stable in a desirable range can be obtained.

Also, according to this invention, the filament bundle obtained by disposing the sheath filaments around the flat helical core filament is not simply fed into the twisting machine proper but is pretwisted before being guided into the twisting machine proper. By this means, even using a flat helical core filament, twisting problems such as the core filament sticking out between the sheath filaments can be prevented.

An apparatus provided by the invention to achieve the above-mentioned second object is an apparatus for manufacturing a steel cord whose cross-sectional shape forms an elliptical shape having a substantially constant orientation comprising one core filament having a substantially two-dimensional wavy form and n (n=5 to 8) sheath filaments around the core filament, and comprises: a bunching type twisting machine proper having a takeup reel; a second flattener disposed upstream of the takeup reel inside the twisting machine proper; an overtwister disposed upstream of the second flattener; a pretwister, a voice and a guide plate disposed successively upstream of the entrance side of the twisting machine proper; a helical wave preformer disposed on a core filament pass line between a supply bobbin and a guide plate, for continuously forming a helical wavy form in the core filament; a first flattener disposed downstream of the helical wave preformer, for flattening the helical wavy form; and a preformer disposed on a sheath filament pass line from supply bobbins to the guide plate.

Other features and advantages of the invention will become apparent from the following detailed description of presently preferred embodiments thereof, but the invention is not limited to the constructions shown in these preferred embodiments and it will be apparent to a person skilled in the art that various changes and modifications can be made to these details and preferred embodiments without deviating from the scope of the invention.

BRIEF DESCRIPTION OF THE DRAWINGS

FIG. 2 is a side view of a first example of a helical wave preformer in the invention;

FIG. 2-A is a partial sectional view of FIG. 2;

FIG. 3 is a side view of a second example of a helical wave preformer in the invention;

FIG. 3-A is a partial sectional view of FIG. 3;

FIG. 4 is a side view of a flattener in the invention;

FIG. 4-A is a partial sectional view of FIG. 4;

FIG. 4-B is a view illustrating roller push-in of a flattener;

FIG. 5 is a side view showing an example of a sheath filament preformer in the invention;

FIG. 6-A is a schematic sectional view of an intemediate product cord in which six sheath filaments have been used;

FIG. 6-B is a schematic sectional view of an intermediate product cord in which eight sheath filaments have been used;

FIG. 7-A is a schematic sectional view of a steel cord obtained according to the invention and comprising six sheath filaments;

FIG. 7-B is a schematic sectional view of a steel cord obtained according to the invention and comprising eight sheath filaments;

FIG. 7-C is a schematic sectional view of a steel cord obtained according to the invention and comprising five sheath filaments;

FIG. 8-A is a schematic sectional view of a steel cord manufactured using a tubular twisting machine and comprising six sheath filaments;

FIG. 8-B is a schematic sectional view of a steel cord manufactured using a tubular twisting machine and comprising eight sheath filaments;

FIG. 9 is a side view of a third example of a helical wave preformer;

FIG. 9-A is a partial enlarged sectional view of FIG. 9;

FIG. 10-A is a schematic sectional view of a core filament having passed through a first flattener; and FIG. 10-B is a schematic sectional view of a core filament having passed through a first flattener.

DETAILED DESCRIPTION OF THE PREFERRED EMBODIMENTS

Figure 1:
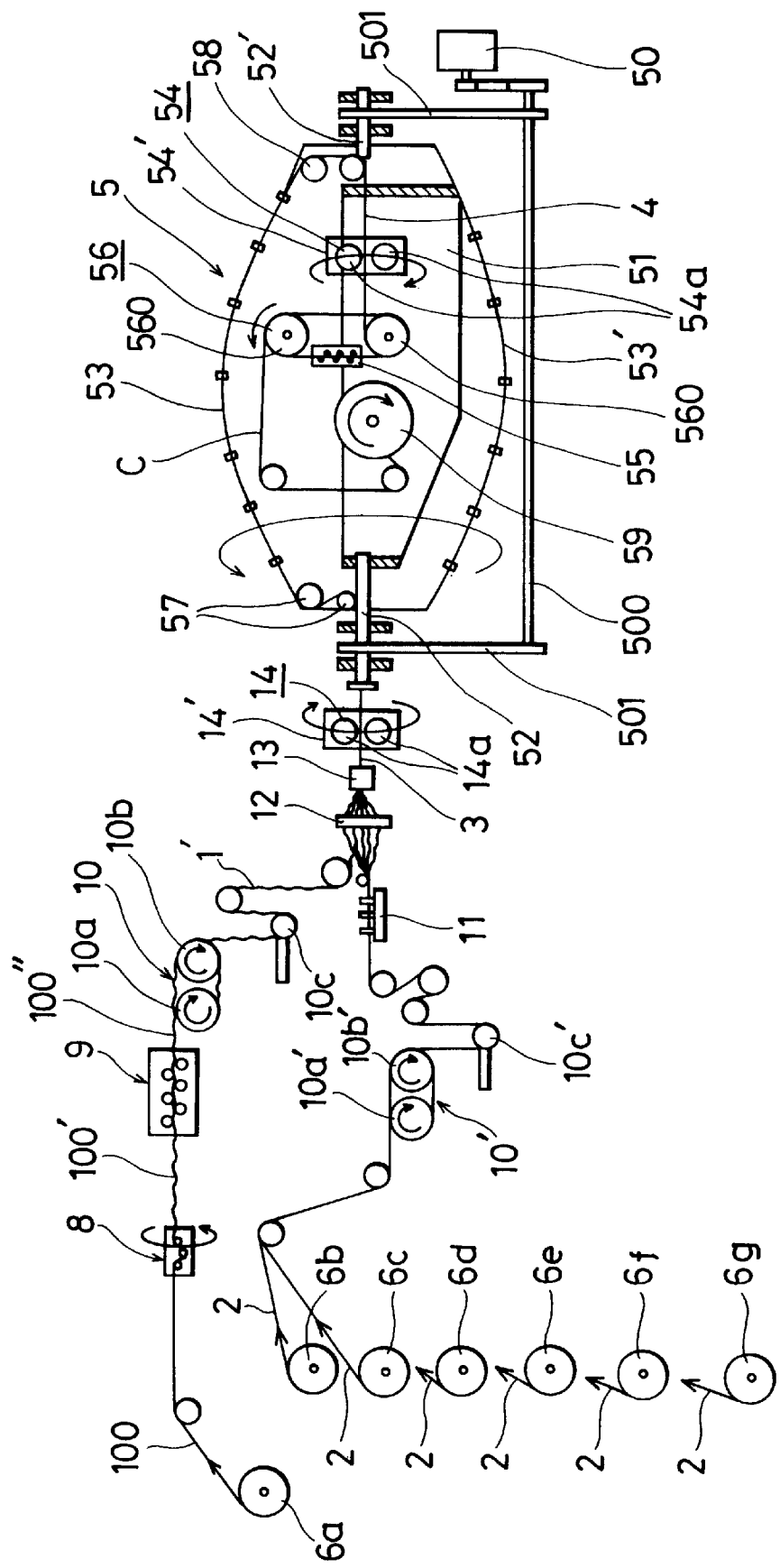
FIG. 1 is a view illustrating a method and apparatus for manufacturing a steel cord for rubber product reinforcement according to the invention.

Preferred embodiments of the invention will now be described with reference to the accompanying drawings.

Steel cords manufactured according to the invention are shown representatively in FIG. 7-A, FIG. 7-B and FIG. 7-C, and are shown with the symbol C. These steel cords C are made up of a single core filament 1 and five to eight sheath filaments 2 disposed around this core filament 1, and in each case the sectional shape perpendicular to the length direction of the cord is an elliptical shape having a fixed orientation.

The core filament 1 and the sheath filaments 2 consist of high carbon steel wires having had their surfaces plated with a plating having good adherence with rubber. Their carbon content is not limited but is normally chosen from 0.70 to 0.85 wt %.

The diameters of the core filament 1 and the sheath filaments 2 are selected from the range 0.14 to 0.4 mm. It is standard for the diameters of the core filament 1 and the sheath filaments 2 to be the same, but in some cases they may be different. That is, the diameter of the sheath filaments may be made larger than that of the core filament.

When the diameters of the core filament 1 and the sheath filaments 2 are the same, to avoid the core filament 1 sticking out through the gaps between the sheath filaments 2, six to eight sheath filaments 2 should be used. When the diameter of the sheath filaments 2 is larger than that of the core filament 1, a minimum of five sheath filaments 2 may be used, as shown in FIG. 7-C.

The core filament 1 has a two-dimensional continuous wavy form. Here, two-dimensional wavy form means that although the form is not a zigzag but rather is helical, in a direction perpendicular to the cord length direction the sectional locus that the core filament 1 describes has the shape of a flat ellipse, that is, the wavy form has the shape of a flat helix. Its flatness Oc, i.e. the ratio a/b of the major axis a to the minor axis b of the ellipse, generally is preferably in the range $1.1 \leq Oc \leq 1.8$. The pitch Pc of the wavy form is of course smaller than the twist pitch of the cord, and in its relationship with the diameter d of the filament generally is preferably $10 \leq pc/d \leq 30$. The height h of the wavy form, because whereas in the related art the wavy form shape of the core filament is a two-dimensional wave in the case of the present invention it is a flat helix shape, differs from the preform rate (R=h/d) in its relationship with the filament diameter d shown in the related art, but generally is preferably kept to $0.12 \leq R \leq 1.5$ when there are six sheath filaments, $0.48 \leq R \leq 1.86$ when there are seven sheath filaments, and $0.98 \leq R \leq 2.36$ when there are eight sheath filaments.

FIG. 1 shows a first example of a steel cord manufacturing method and apparatus according to the invention. In FIG. 1, the reference numeral 100 denotes a core filament starting material and the reference numeral 2 denotes sheath filaments; in FIG. 1 a case wherein six sheath filaments are used is shown, but the invention of course is not limited to this.

In FIG. 1, the part positioned on the right denoted by the reference numeral 5 is the main part of a bunching type twisting machine, and like known twisting machines of its kind has a motor 50, left and right hollow shafts 52, 52' rotated by transmission means (a rotary shaft 500, sprockets and a belt 501 and so on) for transmitting the output from the motor 50, and a cradle 51 swingably supported by way of bearings on these hollow shafts 52, 52'. Rotary bows 53, 53' are mounted coaxially with the cradle 51, and a first turn roller 57 and a second turn roller 58 rotatable integrally with the bows 53, 53' are mounted on the bows 53, 53' in the proximities of the hollow shafts 52, 52'.

An overtwister 54 for correcting turning tendency of the cord and strengthening its preform is mounted on the cradle 51 on the downstream side of the second turn roller 58. A second flattener 55 and a takeup capstan 56 are mounted downstream of this overtwister 54, and a takeup reel 59 for taking up a finished flat steel cord C is mounted downstream of these.

The overtwister 54 has a pair of overtwisting rollers 54a, 54a mounted on a base 541, and is rotated in the pass line of an intermediate cord 4, which will be further discussed later, in the opposite direction to the twisting machine proper 5.

The takeup capstan 56 has a pair of rollers 560, 560, and the cord is wound between these a number of times.

The reference numeral 6a denotes a core filament supply bobbin holding the core filament 100, and the reference numerals 6b through 6g denote a set of sheath filament supply bobbins each holding a sheath filament 2; these are disposed away from the twisting machine proper 5.

Although not shown in the figure, each of the supply bobbins 6a through 6g has a brake device, and by means of these brake devices a single core filament 100 and five to eight sheath filaments 2 are drawn from the bobbins under a predetermined tension.

The reference numeral 8 denotes a helical wave preformer 8 for preforming a helical wavy form in the core filament 1, and this helical wave preformer 8 is disposed on the wire pass line of the core filament 100 downstream of the core supply bobbin 6a. In this preferred embodiment, as shown in FIG. 2, the helical wave preformer 8 has for example three to five pins 80, 81, 82, 83 mounted at a fixed spacing on a base 84. These are normally disposed in a zigzag but may alternatively be in a straight line. Although the pins 80, 81, 82, 83 may be fixed with respect to the base 84, preferably, as shown in FIG. 2-A, bearings 85 are fitted in the base 84 and the pins 80, 81, 82, 83 are supported rotatably about their own axes in these bearings 85.

The helical wave preformer 8 is supported on a frame (not shown), and is revolved about the longitudinal axis of the core filament 1 in the opposite direction to the twisting machine proper 5, as shown with arrows in FIG. 1 and FIG. 2, by a drive mechanism (not shown). The plate shape of the base 84 may be either elliptical or cylindrical.

The reference numeral 9 denotes a first flattener disposed in a fixed position on the pass line downstream of the helical wave preformer 8. This first flattener 9 is for squashing the core filament 100' preformed with a helical wavy form from 180°-symmetrical positions, and as shown in FIG. 4 has two platelike or blocklike bases 90, 90' disposed facing each other and a plurality of (for example about five to ten) cylindrical rollers 91a, 91b mounted at a fixed spacing L on these bases 90, 90' respectively; the rollers 91a of the base 90 and the rollers 91b of the base 90' are disposed with their positions staggered so that they are not directly opposite and as a whole form a zigzag. The rollers 91a, 91b are supported on the bases 90, 90' by bearings 92, as shown in FIG. 4-A, and thus are rotatable about their own axes.

The push-in Ro by which the rollers 91a, 91b push toward the wire pass line as shown in FIG. 4-B is adjustable. With the roller spacing LG between the centers of seven rollers 91a and eight rollers 91b when their faces are just in contact with the core filament 100' as a reference, the push-in refers to the distance by which the centers RC of the rollers 91a aremovedtoward the rollers 91b from this reference roller spacing LG; the larger the push-in Ro is, the stronger the compressing force on the core filament 100' becomes. The push-in may be adjusted by any suitable adjusting means. In FIG. 4, screws 900 are provided in a plurality of locations in the base 90, and the push-in is adjusted by these screws 900 being screwed in to the base 90'. Instead of this, a fixed frame may be mounted in the proximity of the base 90 and a pressing screw passed through this fixed frame and the base 90 pressed with this pressing screw to change its distance from the base 90'. Or, the bearings of the roller shafts themselves may be made movable and the rollers 91a or 91b moved individually.

The second flattener 55 inside the cradle 51 is for compressing the whole of a twisted intermediate product cord from 180°-symmetrical positions too flatten it. Because this second flattener 55 has the same construction as the first flattener 9 described above it will not be described in detail here. However, it is necessary for this second flattener 55 to be made to function with a tension being applied to the cord. To this end, the second flattener 55 is disposed in a route of cord movement between the pair of rollers 560, 560 of the takeup capstan 56. The push-in Ro in this second flattener 55, with the roller spacing LG between the centers of seven rollers 91a and eight rollers 91b when their faces are just in contact with the intermediate product cord 4 as a reference, refers to the distance by which the centers RC of the rollers 91a are moved toward the rollers 91b from this reference roller spacing LG; the larger the push-in Ro is, the stronger the compressing force on the intermediate product cord 4 becomes.

The reference numeral 10 denotes a core filament tension equalizer disposed downstream of the first flattener 9. The tension equalizer 10 is made up of for example a capstan 10a with a powder brake and a driving capstan 10b. The reference numeral 10c denotes a position control sensor disposed downstream of the capstan 10b, and on the basis of a displacement signal from this sensor the drive of the capstan 10b is con trolled to suppress tension variations in the flattened helical core filament 100" and feed out a flattened helical core filament 1' at a higher tension than the helically preformed core filament 100' upstream.

The reference numeral 10' denotes a sheath filament tension equalizer 10' disposed on the wire pass line downstream of the sheath filament supply bobbins 6b through 6g, and like the core filament tension equalizer 10 described above this sheath filament tension equalizer 10' is made up of a capstan 10a' with a powder brake and a driving capstan 10b'40 and has the drive of the driving capstan 10b' controlled by a position control sensor 10c' downstream of the driving capstan 10b'. Atension equalizer 10' may be provided for each of the sheath filaments 2, but for simplicity it is preferable for at least a capstan 10a' with a powder brake and a driving capstan 10b' or these and also a position control sensor 10c' to be used commonly by being made long in the axial direction and having all the sheath filaments 2 passing over them in parallel.

The reference numeral 11 denotes a preformer for preforming the sheath filaments 2 for twisting, disposed in the sheath failament pass line on the downstream side of the tension equalizer 10'. For the preformer 11, basically the same construction as that of the helical wave preformer 8 can be employed. That is, as shown in FIG. 5, for example three to five forming pins 110, 111, 112 are mounted in a zigzag or in a straight line on a base 114.

The forming pins may be fixed with respect to the base 114, but preferably, as in the helical wave preformer 8, they are supported by bearings so that they are rotatable about their own axes. However, unlike the helical wave preformer 8 this preformer 11 is not revolvable and its position is fixed.

Although a preformer 11 may be provided for each of the sheath filaments 2, from the point of view of making the apparatus simple and compact, preferably the base 114 is used commonly and forming pins are provided in parallel in the same number of sets as there are sheath filaments 2.

The reference numeral 12 denotes a guide plate provided downstream of the tension equalizers 10, 10', and this guide plate 12 has a central hole through which the flat helical core filament 100" passes and multiple peripheral holes through which the sheath filaments 2 pass. The reference numeral 13 denotes a voice for converging the core filament 1' and the sheath filaments 2 collected by the guide plate 12 into a filament bundle 3.

The reference numeral 14 denotes a pretwister for pretwisting the filament bundle 3. This pretwister 14 has a base 14' and a pair of pretwisting rollers 14a, 14a for the filament bundle 3 to be wound around, and is rotated about the axis of the filament bundle in the same direction as the twisting machine proper 5.

In this invention, the helical wave preformer 8 for preforming the core filament 100 is not limited to the first example shown in FIG. 2. FIG. 3 shows a second example of the helical wave preformer 8. In this example, the helical wave preformer 8 is made up of a wave preforming part 8a which does not revolve and is positionally fixed and a revolving twisting part 8b disposed in series. The wave preforming part 8a, like the helical wave preformer 8 of FIG. 2, has a plurality of (for example three to five) pins 80, 81, 82, 83 disposed with a uniform spacing in a zigzag (or in a straight line) on a base 84 and is fixed to a frame. The twisting part 8b has an entrance side roller 85 and an exit side roller 87 disposed on a base 84' and has a central roller 86 disposed between the entrance side roller 85 and the exit side roller 87 and of a larger diameter than these rollers, and the core filament 100 is wound at least once around the central roller 86. The entrance side roller 85, the exit side roller 87 and the central roller 86 are supported on the base 84' by bearings 88, as shown in FIG. 3-A, and are rotatable about their own axes. The plate shape of the base 84' may be either elliptical or cylindrical, and this base 84' is rotatably supported on a frame (not shown) and made to revolve about the length direction axis of the wire in the same direction as the direction of rotation of the twisting machine proper 5 by revolution driving means (not shown).

FIG. 9 shows a third example of the helical wave preformer 8. This example is similar to the second example in that is has a wave preforming part 8a which does not revolve and is positionally fixed and a revolving twisting part 8b disposed in series; however, in this third preferred embodiment, between the entrance side roller 85 and the exit side roller 87, two central rollers 86, 86' of a larger diameter than these side rollers are disposed with a gap therebetween. The entrance side roller 85 and the exit side roller 87 and the two central rollers 86, 86' are again mounted rotatably about their own axes in bearings 88. Because the core filament 100 is wound around the two central rollers 86, 86' in a figure of eight several times before being led to the exit side roller 87, the central rollers 86, 86' each have a plurality of grooves 860, as shown in FIG. 9-A.

As for the method by which the helical wave preformer 8 of the first preferred embodiment and the twisting parts 8b of the second preferred embodiment and the third preferred embodiment are made to revolve, for example support shafts are provided in the ends of the revolving base 84 or 84', these support shafts are supported by way of bearings on a frame, a rotation transmission element such as a gear or a belt pulley is provided on one of the support shafts, and this rotation transmission element is connected to rotational transmission means of the drive train of the twisting machine proper 5 by way of speed controlling means. The speed controlling means is for controlling the speed of the base 84 or 84' in accordance with the pitch of the helical wave form to be given to the core filament 100, and for example changing the number of teeth of a timing pulley or a stepless transmission or the like is used.

The same goes for the revolving of the pretwister 14 and the overtwister 54. That is, for example a support shaft is provided in each end or in one end of the base 14', 54', these support shafts are supported on a frame by way of bearings, a rotation transmission element such as a gear or a belt pulley is provided on a support shaft, and this transmission element is connected to rotational transmission means of the drive train of the twisting machine proper 5 by way of speed controlling means.

A manufacturing method according to the invention will now be described.

First explaining the filament route, the core filament 100 is drawn from the supply bobbin 6a and passed through the helical wave preformer 8, passes between the alternately disposed rollers 91a, 91b of the first flattener 9, is pulled around the capstans 10a, 10b of the tension equalizer 10, passes around the control sensor 10c, and is guided through the guide plate 12 and through the center of the voice 13 downstream thereof.

Meanwhile, the sheath filaments 2 are drawn from their respective supply bobbins 6b through 6g, pulled around the capstans 10*a*', 10*b*' of the tension equalizer 10' common to all the filaments, pass around the control sensor 10*c*' and are guided to the guide plate 12, and in the voice 13 are positioned around the flat helical core filament 1' and converge to form the filament bundle 3.

After that, the filament bundle 3 passes in a figure of eight around the pair of rollers 14*a* of the pretwister 14 and is then guided through the hollow shaft 52 into the twisting machine proper 51 is led out through an extraction hole provided mid-way along the hollow shaft 52, passes from the first turn roller 57 through the bow 53, the second turn roller 58 and the hollow shaft 52', goes through the overtwister 54, passes around the drive capstan 56 and through the second flattener 55, and is taken up on the takeup reel 59.

In manufacturing a steel cord, the pin spacings and revolving speeds so on in the helical wave preformer 8 and the preformer 11 are set, in the first flattener 9 and the second flattener 55 the roller push-in of FIG. 4-B is adjusted, and setting of the speeds and so on of the pretwister 14 and the overtwister 54 is carried out.

In the preferred embodiment of FIG. 1 and FIG. 2, the motor 50 is driven to rotate the twisting machine proper 5 (the hollow shafts 52, 52' and the bows 53) in for example the counterclockwise direction as shown in FIG. 1, the pretwister 14 is rotated in the counterclockwise direction about the pass line of the filament bundle 3, the helical wave preformer 8 is rotated in the opposite direction to the twisting machine proper 5, i.e. in this example the clockwise direction, and the overtwister 54 is rotated in the opposite direction to the twisting machine proper 5, i.e. in this example the clockwise direction. In this case, preferably, the ratio of the speed of the helical wave preformer 8 to the speed of the twisting machine proper 5 is chosen from the range 0.8 to 10, the ratio of the speed of the pretwister 14 to the speed of the twisting machine proper 5 is chosen from the range 2.0 to 3.0, and the ratio of the speed of the overtwister 54 to the speed of the twisting machine proper 5 is chosen from the range 0.8 to 1.2.

When this is done, because by the helical wave preformer 8 being revolved in the opposite direction to the direction of rotation of the twisting machine the core filament 100 is screwed while it is jerked from side to side by the pins 80, 81, 82, 83 of the helical wave preformer 8, it is continuously given a helical wavy form, and this core filament 100' with a helical wavy form then passes through the first flattener 9 downstream.

Since this first flattener 9 is not rotating about the pass line, and the alternately disposed rollers 91*a*, 91*b* project by a predetermined amount toward the pass line, the spiral of the helically preformed core filament 100' is alternately pushed by these rollers 91*a*, 91*b* from 180°-symmetrical positions and is plastically deformed from a circular form to an elliptical or similar flat form. As a result, the core filament 100' becomes a core filament 100" with a flat helical continuous wavy form of the kind shown in FIG. 10-A and FIG. 10-B. This core filament 100" is then passed through the center hole of the guide plate 12 under a fixed tension while fluctuations in its tension are suppressed by the tension equalizer 10.

Meanwhile, the five to eight sheath filaments 2 are pulled around the capstans 10*a*', 10*b*' of the tension equalizer 10' without being preformed at all, pass around the control sensor 10*c*' and then are severally guided to the preformer 11. Although the preformer 11 does not revolve, the sheath filaments 2 are jerked from side to side by multiple pins arranged in the same way as those of the helical wave preformer, and because they simultaneously turn about their own axis under the influence of the pretwister as they pass between the pins, they are given a helical form substantially matched to their twist state in the cord. The sheath filaments 2 thus preformed approach the guide plate 12 and are passed through the holes disposed around the central hole thereof.

As a result, the five to eight preformed sheath filaments 2 are collected around the core filament 1' with the flat helical continuous wavy form and guided to the voice 13 where they become a filament bundle 3, and in this state reach the pretwister 14. Because this pretwister 14 is being revolved around the pass line in the same direction as the twisting machine proper 5, the filament bundle 3 is forcibly twisted, and the balance of twisted-in length of the core filament 1' with the flat helical continuous wavy form and the preformed sheath filaments is optimized.

That is, with a double twist type twisting machine, because two twists occur in each rotation of the machine, the twist pitch before the cord passes through the first turn roller 57 (the first twist point) is normally about twice the twist pitch of the product cord. Therefore, considering the length ratio of the sheath filaments to the core filament ($\lambda$=sheath/core), if the ratio before the cord passes around the first turn roller 57 is written $\lambda_1$ and the ratio after the cord passes around the second turn roller 58 (the second twist point) is written $\lambda_2$, then $\lambda_1 < \lambda_2$; however, because the ratio at which the core filament and the sheath filaments are twisted in is determined before the cord passes the first turn roller, a phenomenon of the core filament being too long and sticking out after the second turn roller occurs. This is still more marked when the core filament is preformed, as in the present invention.

To overcome this, in the present invention, the pretwister 14 is used, and by this being revolved in the same direction as the twisting machine proper at a speed at least twice the speed of the twisting machine proper, the twist pitch is made shorter than that of the final cord. As a result, if the length ratio of the sheath filaments to the core filament at the pretwister is written $\lambda_3$, then $\lambda_3 < \lambda_2$, and consequently, after passing through the pretwister 14, the core filament is not too long with respect to the sheath filaments and does not stick out.

Also, as a result of the pretwister 14 being used, because the twist pitch is forcibly shortened, a large preform rate with little variation can be obtained, and because the gaps between filaments are consequently greatly equalized it becomes possible to obtain stable rubber penetration of a high standard.

After that, the filament bundle 3 is guided through the hollow shaft 52 to the inside of the twisting machine proper 5, passes from the first turn roller 57 through the bow 53, passes around the second turn roller 58 and then is twisted a second time. The intermediate product cord 4 thus twisted is then led to the overtwister 54. Because this overtwister 54 is being revolved in the opposite direction to the direction of rotation of the twisting machine proper 5, the intermediate cord 4 is forcibly screwed here and its turning tendency is thereby corrected.

FIG. 6-A and FIG. 6-B each show the state of a cord from which the tension has been removed after passing through the overtwister 54, FIG. 6-A showing a case wherein there are six sheath filaments 2 and FIG. 6-B showing a case wherein there are eight sheath filaments 2. In this state, although the core filament 1' has a flat helical continuous wavy form, the orientation of the ellipse that it describes is not constant in the length direction of the cord, and over the cord length is screwed so that the elliptical locus rotates between the left-right direction and the vertical direction as shown with dashed lines in the figures. Consequently, the cross-sectional shape of the cord at this time, as shown in the figures, has a low flatness, and its major axis and its minor axis are almost the same so that it is close to a circle. This is not suitable from the point of view of the stability of the cord shape and making the rubber gauge thickness thin.

To overcome this, in the present invention, the whole cord is squashed with the second flattener 55. That is, the intermediate cord 4 having passed through the overtwister 54, having been put under tension by being wound several times around the rollers 560, 560 of the takeup capstan 56, passes through the second flattener 55. Since this second flattener 55, like the first flattener 9, is not rotated about the pass line, and several sets of alternately disposed rollers 91a, 91b project by a predetermined amount toward the pass line, the intermediate cord 4 is pressed by the rollers 91a, 91b from 180°-symmetrical directions.

As a result, the flat shape is adjusted, breakup of the cross-sectional shape accompanying the twisting process is prevented, and a cord shape wherein the flat faces are aligned in a fixed direction is formed. Along with this, as a result of the intermediate cord 4 being pressed from 180°-symmetrical directions by the rollers 91a, 91b, the central core filament 1' with a flat helical continuous wavy form is compressed by the sheath filaments 2 pressed toward the inside of the cord by the contact with the rollers 91a, 91b, and plastically deforms so that, of the elliptical locus rotating as described above, parts in 180°-symmetrical positions (for example the regions projecting to the left and right in FIG. 6-A) are squashed. Consequently, as shown in FIG. 7-A and FIG. 7-C, which show product cords, the central core filament 1 is made to change so that it describes an almost two-dimensional elliptical shape, that is, a form wherein the difference between the minor axis b and the major axis a is large, and to a state such that the cross-sectional shape of the cord is constant in the length direction of the cord. In correspondence with this the sheath filaments 2 are also pushed in toward the core filament 1. Of the elliptical locus of the core filament 1' with a flat helical continuous wavy form, because the parts in 180°-symmetrical positions which do not directly undergo compression from the rollers 91a, 91b (for example the regions projecting upward and downward in FIG. 6-A) were plastically deformed in regular wave directions by the first flattener 9, an almost two-dimensional elliptical shape is easily reached. And, because since the core filament 1 has already been flattened in advance by the first flattener 9 the compressing forces exerted by the rollers 91a, 91b can be lightened, problems of the core filament 1 getting between the sheath filaments 2 can be suppressed.

Thus a target cord C is completed and taken up on the takeup reel 59.

When the core filament 100 is preformed with a two-dimensional wavy form using a gear or the like, because it is an intermittent process, scratching tends to occur on the worked parts, and these worked parts become brittle as a result of undergoing repeated working such as stretching and screwing in the twisting process and their durability falls. With the present invention, on the other hand, the core filament 100 is preformed into a helical shape by being given bend and screw continuously in one direction, and this is compressed into a flat helical wave 180°-symmetrically by the first flattener 9.

Consequently, screwing of one time/one twist occurring during twisting is distributed along the entire length of the filament and does not concentrate locally, and good durability can be obtained. Also, the steel cord of this invention has the characteristic that because there is an element of screw in the wavy preform itself it does not readily extend when a tension is applied. Consequently, there is little variation in the balance between the pitch and the height of the wavy preform and a stable shape can be maintained. Furthermore, because it is manufactured with a bunching type twisting machine, productivity is good.

When the helical wave preforming process performed on the core filament 100 is carried out using the helical wave preformer 8 shown in the second preferred embodiment of FIG. 3, the core filament 100 passes between the pins 80, 81, 82, 83 of the wave preforming part 8a and is guided by the entrance side roller 85 of the twisting part 8b to the central roller 86 and wound at least once around this and then guided by the exit side roller 87 to the first flattener 9. At this time the twisting part 8b is revolved about the longitudinal axis of the wire in the same direction as the direction of rotation of the twisting machine proper 5, and consequently, as a result of the core filament 100 passing through the pins 80, 81, 82, 83 of the wave preforming part 8a, it is given a helical wavy form. That is, in this case, as a result of going through the pins 80, 81, 82, 83 of the wave preforming part 8a, the core filament 100 is jerked from side to side, but because the twisting part 8b immediately thereafter is being revolved about the pass line in the same direction as the rotation direction of the twisting machine proper, the core filament 100 is screwed and consequently a helical wavy form is continuously imparted to the core filament 100 passing through the pins 81, 82, 83 of the wave preforming part 8a.

When the helical wave preforming is carried out by means of the third example of FIG. 9, the core filament 100 is successively passed around the pins 80, 81, 82, 83 of the wave preforming part 8a on the pass line and then guided to the twisting part 8b. In this twisting part 8b, after being passed over the entrance side roller 85, it passes around the first central roller 86 and is led to the second central roller 86', passes around this and then passes around the first central roller 86 again in a figure of eight, and finally is passed over the exit side roller 87 before being guided to the first flattener 9.

Because the position of the wave preforming part 8a is fixed on the pass line, the core filament 100 passes from side to side between the pins 80, 81, 82, 83 of the wave preforming part 8a while being turned about its own axis by the revolving of the twisting part 8b, and a helical continuous wavy form is thereby given to the core filament 100.

In the second preferred embodiment and the third preferred embodiment, because the wave preforming part 8a does not revolve and is fixed, and the entrance side roller 85 of the twisting part 8b which follows is kept to a fixed position on the pass line, the shape and dimensions of the helical wavy form given to the core filament 100 are kept uniform. In the third preferred embodiment, because in the twisting part 8b the core filament 100 is wound in a figure of eight around two central rollers 86, 86' disposed in series, it is firmly gripped and does not readily slip. Consequently, it is possible to create a helical wavy form with certainty. And, because there is less occurrence of twisting torque, the overtwist rate can be lowered.

Because whereas the base of the wave preforming part 8a itself is positionally fixed the pins 80 through 83 are rotatable about their own axes, the points of contact with the core filament 100 move successively, friction is greatly decreased and the occurrence of scratching of the core filament 100 can be further reduced.

PREFERRED EMBODIMENTS

Preferred embodiments of the invention will now be shown.

First Preferred Embodiment

Using a core filament of diameter 0.35 mm and six sheath filaments of the same diameter, a flat steel cord of 1+6 structure was manufactured.

As the helical wave preformer, a preformer of the construction shown in FIG. 2 was used. Carbide pins of diameter 2 mm were used for the four pins, and these were disposed on the base with a shaft spacing of 4.0 mm (and an offset of 0.25 mm) in a zigzag and rotatably supported by bearings.

As the sheath filament preformer, a preformer of the construction shown in FIG. 5 was used. With a common base, three carbide pins of diameter 2 mm were used for each filament, and these were disposed on the base with a shaft spacing of 7.5 mm (and an offset of 0.25 mm) in a zigzag and rotatably supported by bearings.

As the first flattener and the second flattener, seven carbide rollers of diameter 16 mm were mounted with a uniform spacing of 21 mm in a first base (90 in FIG. 4) of a pair of facing bases, and eight of the same rollers were mounted with a uniform spacing of 21 mm in the second base (90' in FIG. 4), staggered in phase by 10.5 mm with respect to the rollers on the first base.

In the first flattener, the push-in Ro of the seven rollers was set to 3.0 mm.

In the second flattener, the push-in Ro of the seven rollers was set to 1.5 mm.

As the pretwister, a pair of carbon tool steel rollers of diameter 63 mm were mounted on a base. As the overtwister, a pair of carbide rollers of diameter 100 mm and 78 mm were mounted on a base.

During the manufacture of the steel cord, the helical wave preformer was rotated on the pass line in the opposite direction to the twisting machine proper at a speed of 5.2 times that of the twisting machine proper. The pretwister was rotated on the pass line in the same direction as the twisting machine proper at a speed of 2.7 times that of the twisting machine proper. The overtwister was rotated on the pass line in the opposite direction to the twisting machine proper at a speed of 1.0 times that of the twisting machine proper.

Second Preferred Embodiment

Using one core filament of diameter 0.35 mm and six sheath filaments of the same diameter, a flat steel cord of 1+6 structure was manufactured.

In this preferred embodiment, as the helical wave preformer, the preformer shown in FIG. 3 was used. For the wave preforming part, a part having the same specifications as the helical wave preformer of the first preferred embodiment was used. For the twisting part, rollers of diameter 16 mm were used as the entrance side roller and the exit side roller, and these were rotatably mounted on a base by means of bearings. A roller of diameter 40 mm was used as the central roller, and this was also rotatably mounted on the base by means of a bearing. The core filament was led from the entrance side roller and wound twice around the central roller before being led to the exit side roller. This twisting part was rotated on the pass line in the same direction as the twisting machine proper at a speed of 5.2 times that of the twisting machine proper.

Otherwise the conditions of this preferred embodiment were the same as those of the first preferred embodiment.

Third Preferred Embodiment

Using one core filament of diameter 0.30 mm and five sheath filaments of diameter 0.35 mm, a flat steel cord of a 1+5 structure was manufactured.

In this preferred embodiment, as the helical wave preformer, the preformer shown in the second preferred embodiment was used with the same conditions as in the second preferred embodiment. The push-in Ro in the first flattener was made 3.3 mm, and the push-in Ro in the second flattener was made 1.7 mm.

Otherwise the conditions of this third preferred embodiment were made the same as those of the first preferred embodiment.

First Comparison Example using a core filament of diameter 0.35 mm and six sheath filaments of the same diameter, a flat steel cord of a 1+6 structure was manufactured.

In this first comparison example, as the helical wave preformer the same preformer as that shown in the first preferred embodiment was used with the same conditions as in the first preferred embodiment. The other conditions were also made the same as in the first preferred embodiment, but a first flattener was not used and only the second flattener was used, with the same conditions as in the first preferred embodiment.

Second Comparison Example

Using a core filament of diameter 0.35 mm and six sheath filaments of the same diameter, a flat steel cord of a 1+6 structure was manufactured.

In this second comparison example, in the pass line of the core filament, the helical wave preformer of the first preferred embodiment was removed and instead of a helical wave preformer a set of gear preformers of module 1.5, numbers of teeth $Z_1$:40, $Z_2$:40 was used to preform a zigzag-shaped wavy form in the core filament. A second flattener was used with the same conditions as in the first preferred embodiment.

Third Comparison Example

Using a core filament of diameter 0.35 mm and six sheath filaments of the same diameter, a flat steel cord of a 1+6 structure was manufactured.

In this third comparison example, as the helical wave preformer the same preformer as that shown in the first preferred embodiment was used with the same conditions as in the first preferred embodiment. The other conditions were also made the same as in the first preferred embodiment, but neither a first flattener nor a second flattener was used.

The manufacturing conditions of the first through third preferred embodiments and the first through third comparison examples described above are shown in Table 1, and the characteristics of the steel cords manufactured are shown in Table 2.

In Table 2, the rubber penetrations are values obtained by removing with a cutter knife the rubber on the surface of a cord sample made by covering the steel cord with rubber and visually observing the proportion of rubber covering the surface of the core filament after the sheath filaments are removed. The values are indices with the first comparison example taken as 100.

For the fatigue values a method was employed wherein a sample made by covering a steel cord with rubber is chucked at both ends and moved through a predetermined length to the left and right while threaded between three rollers and the number of repetitions until the cord breaks is obtained, and again the values are indices with the first comparison example taken as 100.

The wave pitch, height and flatness of the core filament were measured by removing the core filament from a product steel cord. For the dispersion rate, fifteen consecutive wave pitches, heights and flatnesses for the core filament were measured and their deviation obtained and expressed as indices with the first comparison example taken as 100.

From this Table 2 it can be seen that in the first, second and third preferred embodiments the cord shape stability and the core filament shape stability are good and the rubber penetration and the fatigue are good. The characteristics of the first comparison example are inferior to those of the first, second and third preferred embodiments. This is because since flattening was only carried out after the cord was twisted and the compressing forces on the cord at that time were inadequate the flat helicality of the core filament was insufficient. In the second comparison example, because at the time of twisting of the cord the core filament had a two-dimensional wavy form and consequently the sheath filaments were not uniformly twisted together, and the core filament readily stretched under tension, there was dispersion in the cord shape and consequently the rubber penetration and fatigue indices are low. In the third comparison example, because flattening of the core filament and flattening of the intermediate product cord are not carried out, the rubber penetration, fatigue performance and shape stability are worse than those of the first comparison example.

TABLE 2

| sample | rubber penetration index | fatigue index | dispersion index |
|---|---|---|---|
| embodiment 1 | 118 | 120 | 91 |
| embodiment 2 | 118 | 119 | 88 |
| embodiment 3 | 117 | 120 | 89 |
| comparison example 1 | 100 | 100 | 100 |

TABLE 2-continued

| sample | rubber penetration index | fatigue index | dispersion index |
|---|---|---|---|
| comparison example 2 | 99 | 70 | 103 |
| comparison example 3 | 95 | 95 | 102 |

What is claimed is:

1. A method for using a bunching type twisting machine to manufacture a steel cord whose cross-sectional shape forms an elliptical shape having a substantially constant orientation in the cord length direction made up of one core filament having a continuous wave of a shorter pitch than the cord twist pitch and n (n=5 to 8) sheath filaments disposed around the core filament, comprising the following steps:

i) preforming a helical continuous wavy form in a core filament and then squashing this to form a flat helical core filament at a stage before it is twisted together with sheath filaments;

ii) making an intermediate product cord by twisting n sheath filaments around the flat helical core filament; and iii) squashing and thereby flattening and then taking up the intermediate product cord.

2. A method according to claim 1, wherein the core filament is drawn from a supply bobbin and on the pass line this core filament is preformed into a helical continuous wavy form and then is compressed from 180°-symmetrical positions into a flat helical form while n sheath filaments are drawn from supply bobbins and each given a preform for twisting on the pass line and then the sheath filaments are converged around the flat helical core filament to form a filament bundle and this filament bundle is pretwisted to a shorter twist pitch than the twist pitch to be formed by the twisting machine and then fed to the twisting machine and twisted to make an intermediate product cord and this intermediate product cord is then compressed from 180°-symmetrical positions while under tension inside the twisting machine and thereby formed into a final cord shape and then taken up onto a reel.

3. A method according to claim 2, wherein the step of preforming the core filament into a helical continuous wavy form is carried out by using a helical wave preformer (8) having a plurality of pins (80) (81) (82) (83) disposed with a uniform spacing on a base (84) and passing the core filament between the pins and in this state rotating the helical wave preformer (8) on the pass line at a speed of 1.4 to 8.3 times the speed of the twisting machine proper (5) and in the

TABLE 1

| sample | cord structure | cord twist pitch (mm) | cord flatness (major axis/minor axis) | filament diameter core/sheath (mm) | *1 | *2 (mm) | *3 (mm) | *4 (a/b) | *5 (mm) | *6 (mm) |
|---|---|---|---|---|---|---|---|---|---|---|
| embodiment 1 | 1 + 6 | 18 | 1.17 | 0.35/0.35 | FIG. 2 | 5.0 | 0.48 | 1.26 | 3.0 | 1.5 |
| embodiment 2 | 1 + 6 | 18 | 1.17 | 0.35/0.35 | FIG. 3 | 5.1 | 0.49 | 1.27 | 3.0 | 1.5 |
| embodiment 3 | 1 + 5 | 18 | 1.16 | 0.30/0.35 | FIG. 2 | 5.0 | 0.43 | 1.26 | 3.3 | 1.7 |
| comparison example 1 | 1 + 6 | 18 | 1.11 | 0.35/0.35 | FIG. 2 | 5.1 | 0.50 | 1.02 | 0 | 1.5 |
| comparison example 2 | 1 + 6 | 18 | 1.20 | 0.35/0.35 | gear method | 5.2 | 0.51 | 1.45 | 0 | 1.5 |
| comparison example 3 | 1 + 6 | 18 | 1.01 | 0.35/0.35 | FIG. 2 | 5.1 | 0.50 | 1.02 | 0 | 0 |

*1 helical wave preforming method
*2 helical wavy form pitch
*3 helical wavy form wave height
*4 core filament flatness of product
*5 roller push-in of first flattener
*6 roller push-in of second flattener opposite direction to the direction of rotation of the twisting machine proper (5).

4. A method according to claim 2, wherein the step of preforming the core filament into a helical continuous wavy form is carried out by using a device comprising a wave preforming part (8*a*) and a twisting part (8*b*) disposed in series and the wave preforming part (8*a*) has a plurality of pins (80) (81) (82) (83) disposed with a uniform spacing on a base (84) and the twisting part (8*b*) has an entrance side roller (85) and an exit side roller (87) mounted on a base (84') and one or more central rollers (86), (86') of a larger diameter than these side rollers and the core filament is passed between the pins (80) (81) (82) (83) of the wave preforming part (8*a*) and then fed from the entrance side roller (85) to the central rollers (86), (86') of the twisting part (8*b*) and wound around the central rollers (86), (86') at least once and then passed over the exit side roller (87) and in this state the twisting part (8*b*) is revolved on the pass line at a speed of 1.4 to 8.3 times the speed of the twisting machine proper (5) and in the same direction as the direction of rotation of the twisting machine proper (5).

5. A method according to claim 2, wherein the step of compressing the core filament from 180°-symmetrical positions into a flat helical form after it is preformed with the helical continuous wavy form is carried out by using a device (9) having a plurality of rotatable rollers (91*a*), (91*b*) mounted with a uniform spacing on a pair of facing bases (90), (90') in an overall zigzag and feeding the core filament preformed with a helical continuous wavy form between the rollers.

6. A method according to claim 2, wherein the step of compressing the intermediate cord from 180°-symmetrical positions while it is under tension inside the twisting machine and thereby forming it into a final cord shape is carried out by using a second flattener (55) having a plurality of rotatable rollers (91*a*), (91*b*) mounted with a uniform spacing on a pair of facing bases (90), (90') in an overall zigzag and feeding the intermediate product cord (4) between the rollers.

7. A method according to claim 2, wherein the core filament and the sheath filaments are high carbon steel wires of diameter 0.14 to 0.4 mm having had their surfaces plated with a plating having good adherence with rubber.

8. A method according to claim 7, wherein the core filament and the sheath filaments are of the same diameter.

9. A method according to claim 7, wherein the diameter of the sheath filaments is larger than that of the core filament.

10. An apparatus for manufacturing a steel cord whose cross-sectional shape forms an elliptical shape having a substantially constant orientation comprising one core filament having a substantially two-dimensional wavy form and n (n=5 to 8) sheath filaments around the core filament, the apparatus comprising:

i) a bunching type twisting machine proper (5) having a takeup reel (59);

ii) a second flattener (55) disposed upstream of the takeup reel (59) inside the twisting machine proper;

iii) an overtwister (54) disposed upstream of the second flattener (55);

iv) a pretwister (14), a voice (13) and a guide plate (12) disposed successively upstream of the entrance side of the twisting machine proper;

v) a helical wave preformer (8) disposed on a core filament pass line between a supply bobbin and a guide plate (12), for continuously forming a helical wavy form in the core filament;

vi) a first flattener (9) disposed downstream of the helical wave preformer (8), for flattening the helical wavy form; and vii) a preformer (11) disposed on a sheath filament pass line from supply bobbins to the guide plate (12).

11. An apparatus according to claim 10, wherein a takeup capstan (56) is provided upstream of the takeup reel (59) and the second flattener (55) is disposed on a cord movement path between a pair of facing rollers (560), (560) of the takeup capstan (56).

12. An apparatus according to claim 10, wherein there are further provided tension equalizers (10), (10') respectively on the core filament pass line between the guide plate (12) and the first flattener (9) and on the sheath filament pass line upstream of the preformer (11).

13. An apparatus according to claim 10, wherein the helical wave preformer (8) comprises a plurality of pins (80) (81) (82) (83) rotatably mounted with a uniform spacing on a base (84).

14. An apparatus according to claim 10, wherein the helical wave preformer (8) comprises a non-revolving wave preforming part (8*a*) and a revolving twisting part (8*b*) disposed in series and the wave preforming part (8*a*) has a plurality of pins (80) (81) (82) (83) rotatably mounted with a uniform spacing on a base (84) and the twisting part (8*b*) has an entrance side roller (85) and an exit side roller (87) and between these a larger central roller (86) rotatably mounted on a base (84').

15. An apparatus according to claim 10, wherein the helical wave preformer (8) comprises a non-revolving wave preforming part (8*a*) and a revolving twisting part (8*b*) disposed in series and the wave preforming part (8*a*) has a plurality of pins (80) (81) (82) (83) rotatably mounted with a uniform spacing on a base (84) and the twisting part (8*b*) has an entrance side roller (85) and an exit side roller (87) rotatably mounted on a base (84') and two central rollers (86), (86') of larger diameters than the entrance side roller (85) and the exit side roller (87) rotatably mounted between the entrance side roller (85) and the exit side roller (87), for the core filament to be wound around in a figure of eight.

16. An apparatus according to claim 10, wherein the first flattener (9) and the second flattener (55) each comprise a plurality of rotatable rollers (91*a*), (91*b*) mounted with a uniform spacing on bases (90), (90').

* * * * *